April 18, 1967   E. A. MENARD   3,315,145
INVERTER WITH IMPROVED COMMUTATION OPERATION
Filed July 6, 1964

INVENTOR
EDWARD A. MENARD

BY
ATTORNEY

United States Patent Office 3,315,145
Patented Apr. 18, 1967

3,315,145
INVERTER WITH IMPROVED COMMUTATION
OPERATION
Edward A. Menard, Ulster County, N.Y., assignor to International Business Machines Corporation, New York, N.Y., a corporation of New York
Filed July 6, 1964, Ser. No. 380,531
5 Claims. (Cl. 321—44)

This invention relates to inverter circuits for producing alternating output current from a direct current source. More particularly, this invention relates to inverter circuits which utilize a pair of main controlled rectifier elements for alternately energizing a load and a pair of controlled rectifier commutation circuits for extinguishing the conduction of the main controlled rectifiers.

Controlled rectifiers such as the silicon controlled rectifier have become increasingly popular for utilization in inverter circuits of relatively high power. Such controlled rectifier can be caused to conduct in a forward direction by at least one of two different conditions, one of which is desirable and the other of which is relatively undesirable. To be more specific, the desirable conditions for causing such rectifiers to conduct are by applying a proper potential between the cathode and anode electrodes and by applying a properly oriented gate to the control electrode so as to permit forward conduction through the rectifier. However, another characteristic of the controlled rectifier which gives rise to the undesirable condition is that it will conduct in a forward direction if the cathode-anode potential is applied thereto at too rapid a rate notwithstanding the absence of a proper gate at the control electrode. That is, if the time rate of change of the applied cathode-anode potential is too steep, the controlled rectifier will conduct. This is sometimes referred to as the $dv/dt$ problem.

Inverter circuits herein involved utilize a pair of main controlled rectifiers, one to cause current conduction through the load in one direction and the other to cause load current in the opposite direction. Of necessity, circuits utilizing such an arrangement must have the first controlled rectifier completely turned off before the second controlled rectifier is turned on or else a short circuit is placed completely across the power source which not only prevents current from passing through the load but in addition can completely destroy the controlled rectifiers themselves. In any event, circuit operation would be completely disrupted.

Accordingly, various arrangements have been developed for commutating the main controlled rectifiers on and off to insure that the aforementioned short circuit does not occur. In fact, additional controlled rectifiers have frequently been utilized as the main element of the commutator portion in conjunction with a commutating capacitor. However, the same $dv/dt$ problem mentioned hereinbefore is involved with the commutator controlled rectifiers. In addition, the commutator controlled rectifiers must be capable of withstanding even greater forward and reverse potentials than that which is applied from the power source if a resonant type circuit for controlling the charging and discharging of the commutating capacitor is utilized.

In one embodiment of the present invention, the commutator controlled rectifiers each have included in series circuit relation therewith an individual inductor for the purpose of resolving the $dv/dt$ problem for the commutator rectifiers. In another embodiment of the present invention, reverse poled diodes are included across the commutator controlled rectifiers for effectively clamping the charging of the commutation capacitor at a sufficiently low level so that the commutator rectifiers are never forced to withstand more than a potential slightly above the power source potential.

To be more specific, the present invention utilizes a commutator circuit comprised of a controlled rectifier and an inductor connected in series therewith for each main controlled rectifier. The two commutator sections are coupled to the main controlled rectifiers by means of a commutator capacitor which is connected to the juncture of the two commutator sections. By this arrangement, the extinguishing of conduction through both the main controlled rectifiers and the commutator controlled rectifiers is assured. An additional feature of the present invention is minimization of the potential that must be withstood by the commutator rectifiers by means of the aforementioned commutator diode arrangement.

Therefore, it is an object of the invention to provide an improved inverter circuit utilizing controlled rectifier elements for producing an alternating current from a direct current source.

It is another object of the present invention to provide an improved inverter circuit wherein the extinguishing of current conduction in both the main and the commutator controlled rectifiers is assured.

It is yet another object of the present invention to provide an inverter circuit wherein inadvertent conduction of the commutator controlled rectifiers is prevented.

Still another object of the persent invention is to provide a controlled rectifier converter circuit wherein the voltage withstanding capability of the controlled rectifiers in the commutator section is minimized.

Yet another object of the present invention is to provide controlled rectifier inverter operation which is relatively independent of load variations.

Another object of the present invention is to provide inverter circuitry operations utilizing resonant circuitry but not requiring excessive voltage handling capabilities for the commutating controlled rectifiers.

The foregoing and other objects, features and advantages of the present invention will be apparent from the following more particular description of preferred embodiments of the invention as illustrated in the accompanying drawings in which.

Figure 1:
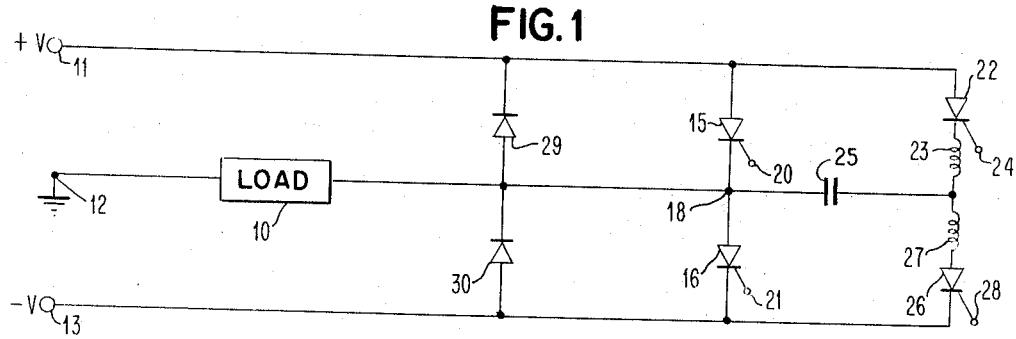
FIGURE 1 illustrates an embodiment of the present invention for preventing inadvertent conduction of commutator controlled rectifiers.

In the inverter circuit shown in FIGURE 1, it is desirable to energize load 10 from the direct current potential applied at terminals 11, 12 and 13. The potential applied to the aforementioned terminals is produced by a three terminal power source (not shown) so that the potential at terminal 11 will be positive with respect to the potential at terminal 12 while the potential at terminal 12 will be positive with respect to the potential at terminal 13. It should be understood that the potential at terminal 13 need not be negative but could in fact be positive and that the potential at terminal 11 could be negative as long as the relative polarities between the three terminals and the proper current conduction paths are observed. The object is to energize load 10 first with a current from terminal 11 in one direction and subsequently with a current from terminal 13 thus producing an alternating potential across load 10.

In general, the objectives of the circuit are met by first causing controlled rectifier 15 to conduct and cease conduction and subsequently causing controlled rectifier 16 to conduct and cease conducting. This has the effect of placing circuit point 18 first at the same potential as is applied at terminal 11 and subsequently at the same potential that is applied at terminal 13 thereby permitting current conduction through load 10 first in one direction and subsequently in the other direction.

Ideally the circuit operation would be realized by simply introducing a gate or trigger of proper polarity to control electrode 20 so as to cause controlled rectifier 15 to conduct, removing the signal from control electrode 20 so that conduction through 15 would cease and then applying a conduction signal to electrode 21 for gating controlled rectifier 16 into conduction. Unfortunately, it is a characteristic of controlled rectifiers that, once conduction has been established, it cannot be extinguished unless the potential from cathode to anode is completely removed or, in some cases, unless a negative or nonconducting signal of sufficient magnitude is introduced to the control element or electrode. Thus, if nothing more than the circuit operation as was just described were performed, controlled rectifier 15 would continue to conduct even after controlled rectifier 16 were energized thus placing an effective short circuit between terminals 11 and 13 which would have the effect of preventing any significant current from flowing through load 10 and could cause the two controlled rectifiers to destroy themselves.

Therefore, it is necessary to include commutating circuitry as will now be described. To be more specific, two separate commutator sections are included, the first including controlled rectifier 22 and, in series circuit relation therewith, inductor 23 while the second section includes controlled rectifier 26 and series connected inductor 27. The object of these two commutator sections is to control the charging and discharging of commutating capacitor 25.

Figure 2:
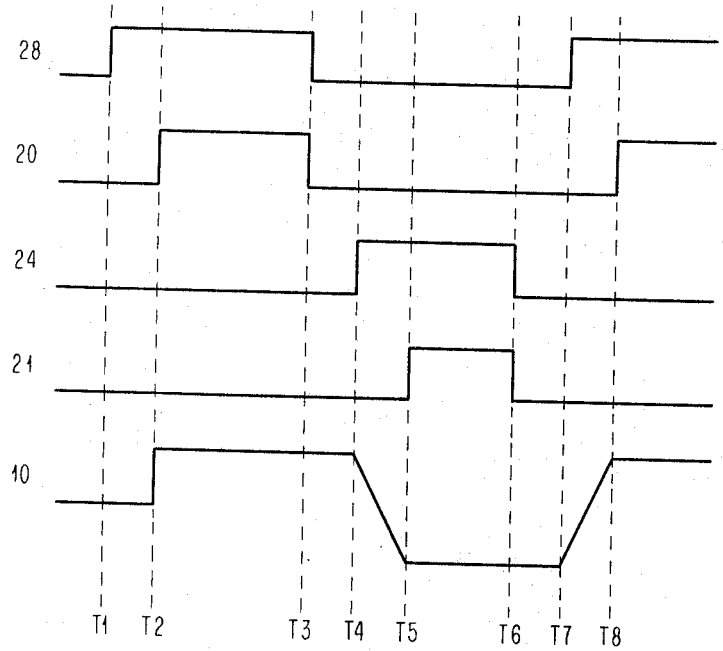
FIGURE 2 is a time based diagram of the triggers or gates required to operate the circuitry illustrated in FIGURE 1.

Consider the operation of the FIGURE 1 circuitry as will be described in conjunction with the time based diagram of FIGURE 2. It is to be understood that the conduction triggers or gates for the controlled rectifiers are produced by circuitry which is not shown but which could be provided by any of a variety of well known gating devices. For instance, a master oscillator could actuate a ring counter which would produce various output pulses in response thereto and which could cause signals corresponding to the pulses indicated in FIGURE 2 for electrodes 20, 21, 24 and 28. It should be noted that the pulses and time increments of FIGURE 2 are somewhat idealized in order to simplify the description of the circuit operation. Also the output waveform as shown in FIGURE 2 is based upon the assumption that load 10 is at least slightly inductive as is frequently the case.

Assume that the circuit has had a potential applied to terminals 11, 12 and 13 as shown and that no operations have been conducted by the circuit prior to time T1. At time T1, a gate is introduced to the control electrode 28 which would cause rectifier 26 to conduct and, very shortly thereafter at time T2, a gate is introduced to control electrode 20 to cause rectifier 15 to conduct. This places the potential of terminal 11 at circuit point 18 thus placing the entire potential between terminals 11 and 13 across the series circuit including capacitor 25, inductor 27 and controlled rectifier 26. In addition, the forward conduction of controlled rectifier 15 will cause current to flow from terminal 11 through controlled rectifier 15 into load 10.

Initally, the total potential between terminals 11 and 13 (which shall be referred to as E hereinafter) will appear entirely across inductor 27 and will decay as capacitor 25 charges to the potential E. When the potential across inductor 27 has reached a zero level, the current in inductor 27 will have reached maximum and will begin to decrease causing a reverse potential to begin to appear across inductor 27. Since controlled rectifier 26 cannot conduct in the reverse direction, capacitor 25 will charge to a value of 2E to compensate for the reversed field effect across inductor 27 and will hold that charge after the inductor reverse potential has collapsed. Controlled rectifier 15 continues to conduct current into load 10 even after time T3 when the conduction gate is removed from both control electrode 20 and control electrode 28.

However, at time T4, a conduction gate or trigger is introduced to control rectifier 22 by means of control element 24. This has the effect of placing capacitor 25 with its charge directly across controlled rectifier 15 with the charge potential thereof being of the proper polarity to extinguish current conduction through rectifier 15. At that point, capacitor 25 could discharge through load 10, terminals 12 and 11 and rectifiers 22 and inductor 23 but the inclusion of diode 29 to provide a more convenient discharge path can increase the circuit response time and permit capacitor 25 to more rapidly discharge.

Immediately thereafter at time T5, controlled rectifier 16 is gated on by the signal at electrode 21. This permits capacitor 25 to acquire a charge through rectifier 22 and inductor 23 which is reverse from that which it originally held as a result of the action of controlled rectifier 26 and inductor 27 as discussed hereinbefore. Since the charge that capacitor 25 held from the first half cycle was 2E in magnitude, the gating of rectifier 22 on will place 2E across inductor 23 initially which will build up a reverse charge on capacitor 25 of 2E magnitude as a result.

The conduction of rectifier 16 places circuit point 18 at the same potential as is applied at terminal 13 which will result in reverse current flow through load 10. Assuming that load 10 is at least slightly inductive, the cessation of current flow through rectifier 15 would cause load 10 to attempt to reverse the potential thereacross as is indicated between times T4 and T5 in FIGURE 2. At T5, the gating of rectifier 16 will reinforce this potential reversal across load 10 and hold it at that level as is indicated between times T5 and T7.

The operation of the circuitry of FIGURE 1 has the advantage that inductor 27 will prevent rectifier 26 from being inadvertently caused to conduct by the rapid time rate of change of potential applied thereacross when rectifier 22 is gated on while, conversely, inductor 23 will block rectifier 22 from being gated on by the $dv/dt$ resulting from gating rectifier 26 on. If a single inductor in series resonant circuit relation with capacitor 25 were included with this circuit being energized by gating on one of the commutator rectifiers, the inductor would develop a voltage of a first polarity and would attempt to develop a reverse polarity thereafter which could also cause a sufficiently sharp potential rise across the now conducting commutator controlled rectifiers to cause it to conduct in addition to the other controlled rectifier. Thus either of the foregoing circumstances could cause the condition of having both commutator controlled rectifiers conducting thereby shorting the power source. However, by utilizing separate inductors in series with each commutator controlled rectifier, the $dv/dt$ across the associated controlled rectifier cannot rise sharply enough to cause unintended conduction. Diode 30 is included to perform a function similar to diode 29 for permitting capacitor 25 to discharge after controlled rectifiers 22 and 16 have completed the second half of the cycle.

Figure 3:
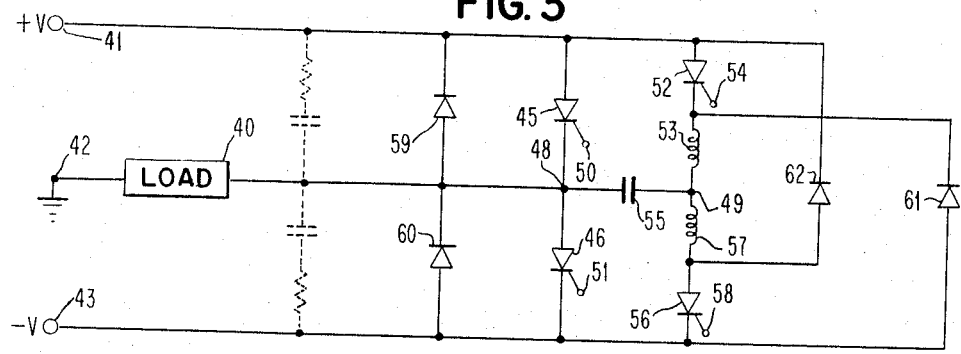
FIGURE 3 is an embodiment of the present invention showing the arrangement for minimizing the potential which must be withstood by the commutator controlled rectifiers.

FIGURE 3 reveals circuitry which basically operates the same as the FIGURE 1 circuitry but which includes an arrangement for minimizing the forward and reverse potential which the commutator controlled rectifiers must initially withstand. The timing gates or triggers shown in FIGURE 2 would be basically the same if applied to FIGURE 3. Assuming that rectifier 56 and rectifier 45 have just been turned on and rectifiers 52 and 46 are off, capacitor 55 will begin to charge toward the potential of terminal 41 which is effectively at circuit point 48 while the voltage across inductor 57 will decay to zero substantially as described before. At this point, capacitor 55 will contain a charge of E just as the potential across inductor 57 begins to reverse. However, as circuit point 49 begins to become more positive because of the potential reversal across inductor 57, diode 61 will begin to conduct thus clamping the charge potential across capacitor 55 at slightly above E. Further, the circuit operation during the next half cycle of circuit operation during which controlled rectifiers 45 and 56 are off while controlled rectifiers 52 and 46 are on will result in a recharging of capacitor 55 to the same level (slightly above E) since this will be the maximum potential which can be initially developed across inductor 53 during the second half cycle.

It should be appreciated that the critical time for limiting the potential across capacitor 55 is the start up time only. This is true because the subsequent charging of capacitor 55 by means of the potential developed across inductors 53 and 57 will track so that the maximum potential to which 55 will charge subsequent to start up is the same magnitude as the initial charge potential. After capacitor 55 has charged to a potential as a result of rectifiers 45 and 56 initially conducting, the energization of rectifiers 46 and 52 for the next half cycle means that the charge across capacitor 55 will be in aiding relation to the potential developed across inductor 53 and will not follow the double charging operation which is initially encountered. Therefore, if the timing means which is utilized for gating the rectifiers on is properly controlled so that rectifier 52 is always gated on initially, then only diode 61 need be included and diode 62 could be omitted entirely. Conversely, if rectifier 56 will always be initially energized, then diode 61 could be omitted and only diode 62 included. Another modification of the circuitry of the present invention would be to include a single diode across both inductors in the commutator sections but oriented to conduct in a direction opposite the commutator controlled rectifier. In FIGURE 3, this would mean that diode 61 would be left out entirely and the upper connection of diode 62 would be coupled to the juncture between rectifier 52 and inductor 53 instead of being coupled to terminal 41 as shown. This arrangement would operate substantially the same as the FIGURE 3 circuitry.

Furthermore, the diode which is included in accordance with either of the aforementioned modifications could be removed from operation after the start up period without effecting the charge potential that will be received by 55 and thereby increase both the efficiency of the circuit operation and the maximum operating frequency for the inverter. An example of how such a diode can be removed from the circuitry after start up would be an arrangement including a single shot or latch circuit which is energized by the first pulse across the load 40 for operating a relay to open a contact point in series with the diode. The latch or single shot could be reset each time the power is applied to the inverter. Other means for providing for removing the start up diode will be apparent within the scope of the present invention.

The series resistor-capacitor combinations which are shown in dashed lines in FIGURE 3 are included only for spike suppression which might result when rectifiers 45 and 46 are energized. It should be appreciated that the commutator circuitry of the disclosed embodiments, although resonant in nature, is independent of load variations.

While the invention has been particularly shown and described with reference to preferred embodiments thereof, it will be understood by those skilled in the art that various changes in form and details may be made therein without departing from the spirit and scope of the invention.

What is claimed is:

1. An improved inverter circuit comprising
   power source means having first, second and third terminals, the potential at said first terminal being positive with respect to the potential at said second terminal and the potential at said second terminal being positive with respect to said third terminal,
   first and second circuit points,
   load means connected between said second terminal and said first circuit point,
   first and second controlled rectifier means connected for forward conduction from said first terminal to said first circuit point and from said first circuit point to said third terminal respectively,
   capacitor means connected between said first and second circuit points,
   first and second commutator sections each including in series circuit relation an inductor and, respectively, a third and fourth controlled rectifier means,
   said first and second sections being connected for providing forward conduction from said first terminal to said second circuit point and from said second circuit point to said third terminal respectively, and
   means for cyclically triggering into conduction said fourth and first controlled rectifier means and said third and second controlled rectifier means for completing charge paths for said capacitor, the timing of the triggers during one cycle alternately placing the charge potential on said capacitor across said first and second controlled rectifier means for terminating conduction therethrough.

2. An improved inverter in accordance with claim 1 which includes first and second diode means connected across said first and second controlled rectifier means respectively for presenting low impedance discharge paths for said capacitor means.

3. An improved inverter in accordance with claim 1 wherein the said inductor of one of said commutator sections is connected on one side to said second circuit point and on the other side to the said controlled rectifier means associated therewith, and which further includes diode means connected between the said other side of said inductor and the said terminal to which the other of said commutator sections is connected for limiting the magnitude of charge potential across said capacitor means.

4. An improved inverter in accordance with claim 1 wherein the said inductors of said commutator sections are commonly connected on one side to said second circuit point, and which further includes diode means connected to the other sides of said inductors for providing a current path thereacross opposite the current path of said third and fourth controlled rectifier means.

5. An improved inverter circuit comprising
   power source means including first, second and third terminals with the potential at said first terminal being positive with respect to the potential at said second terminal and the potential at said second terminal being positive with respect to said third terminal,
   first and second circuit points,
   load means connected between said second terminal and said first circuit point,
   first and second controlled rectifiers connected for forward conduction from said first terminal to said first circuit point and from said first circuit point to said third terminal respectively,
   first and second diodes connected in reverse conduction relation across said first and second controlled rectifiers respectively,
   a capacitor connected between said first and second circuit point,
   first and second inductors commonly connected on one side to said second circuit point,
   a third controlled rectifier coupled in forward conduction relation between said first terminal and the other side of said first inductor, a fourth controlled rectifier coupled in forward conduction relation between the other side of said second inductor and said third terminal, a third diode connected between said first terminal and the said other side of said second inductor for providing a reverse conduction path relative to said third controlled rectifier, a fourth diode connected between said third terminal and the said other side of said first inductor for providing a reverse current path relative to said fourth controlled rectifier, and cyclic timing means for introducing and removing conduction causing gates alternately to said first and fourth controlled rectifiers and to said second and third controlled rectifiers with the said gates introduced to said third and fourth controlled rectifiers at least slightly preceding the said gates introduced to said first and second controlled rectifiers, said cyclic timing means being constructed and arranged for starting operation of said inverter circuit by introducing the initial said conduction gate to one of said third and fourth controlled rectifiers.

References Cited by the Examiner

UNITED STATES PATENTS

| | | | |
|---|---|---|---|
| 3,131,343 | 4/1964 | Reinert | 321—16 |
| 3,181,053 | 4/1965 | Amato | 321—45 |
| 3,263,152 | 7/1966 | Walher | 321—45 |

References Cited by the Applicant

UNITED STATES PATENTS

| | | |
|---|---|---|
| 2,475,621 | 7/1949 | Klemperer. |
| 3,047,789 | 7/1962 | Lowry. |
| 3,080,534 | 3/1963 | Paynter. |
| 3,118,105 | 1/1964 | Relation et al. |
| 3,120,633 | 2/1964 | Genuit. |

OTHER REFERENCES

IBM Technical Disclosure Bulletin, vol. 6, No. 8, January 1964, pp. 30–32.

IEEE Conference Paper CP 63–243 by Colclasser et al.

Silicon Controlled Rectifier Manual, 2nd ed., Gutzwiler et al., General Electric Co., Auburn, N.Y., 1961, p. 162.

JOHN F. COUCH, *Primary Examiner.*

W. M. SHOOP, *Assistant Examiner.*